US012771714B2

(12) United States Patent
Wu

(10) Patent No.: US 12,771,714 B2
(45) Date of Patent: Oct. 20, 2026

(54) ATTACK DEFENSE METHOD AND DEVICE, AND SYSTEM

(71) Applicant: Huawei Technologies Co., Ltd., Shenzhen (CN)

(72) Inventor: Bo Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 18/768,347

(22) Filed: Jul. 10, 2024

(65) Prior Publication Data

US 2026/0058989 A1 Feb. 26, 2026

Related U.S. Application Data

(63) Continuation of application No. PCT/CN2022/118344, filed on Sep. 13, 2022.

(30) Foreign Application Priority Data

Jan. 27, 2022 (CN) ........................ 202210103362.8

(51) Int. Cl.
*H04L 9/40* (2022.01)

(52) U.S. Cl.
CPC ...... *H04L 63/1458* (2013.01); *H04L 63/1425* (2013.01)

(58) Field of Classification Search
CPC ........................ H04L 63/1458; H04L 63/1425
See application file for complete search history.

(56) References Cited

U.S. PATENT DOCUMENTS

| | | | | |
|---|---|---|---|---|
| 8,479,282 | B2 * | 7/2013 | Hamada | H04L 63/1458 709/224 |
| 9,809,159 | B1 * | 11/2017 | Snyder | B60W 40/09 |
| 10,721,212 | B2 * | 7/2020 | Chao | H04L 43/026 |
| 11,159,546 | B1 * | 10/2021 | Moore | H04L 63/1425 |
| 11,895,146 | B2 * | 2/2024 | Togari | H04L 63/1425 |
| 2012/0117254 | A1 * | 5/2012 | Ehrlich | H04L 63/1408 709/228 |
| 2016/0036837 | A1 * | 2/2016 | Jain | H04L 63/1416 726/23 |
| 2018/0013787 | A1 * | 1/2018 | Jiang | H04L 43/16 |
| 2018/0019931 | A1 * | 1/2018 | Jalan | H04L 43/106 |

(Continued)

FOREIGN PATENT DOCUMENTS

| | | | |
|---|---|---|---|
| CN | 101540761 | A | 9/2009 |
| CN | 112134845 | A | 12/2020 |
| WO | 2009064114 | A2 | 5/2009 |

*Primary Examiner* — Meng Li
(74) *Attorney, Agent, or Firm* — Conley Rose, P.C.

(57) ABSTRACT

An attack defense method, where addresses in a protected network are divided into a plurality of address ranges that include a first address range and a second address range. The first address range is a proper subset of the second address range, or the second address range is a proper subset of the first address range. A protection device or a server coupled to the protection device collect statistics on first traffic that passes through the protection device. When the statistics exceed a first threshold, the protection device performs defense processing on the first traffic. The first traffic is of a target type and has a destination address that is in the first address range. The first address range and the second address range are address ranges of different granularities.

20 Claims, 7 Drawing Sheets

(56) References Cited

U.S. PATENT DOCUMENTS

| | | | | |
|---|---|---|---|---|
| 2020/0220896 | A1 | 7/2020 | Jiang | |
| 2020/0358743 | A1 * | 11/2020 | Duan | H04L 63/1425 |
| 2023/0092522 | A1 * | 3/2023 | Li | H04L 63/0254 726/22 |

* cited by examiner

ATTACK DEFENSE METHOD AND DEVICE, AND SYSTEM

CROSS-REFERENCE TO RELATED APPLICATIONS

This is a continuation of International Patent Application No. PCT/CN2022/118344 filed on Sep. 13, 2022, which claims priority to Chinese Patent Application No. 202210103362.8 filed on Jan. 27, 2022, which are hereby incorporated by reference.

TECHNICAL FIELD

This disclosure relates to the field of network security, and in particular, to an attack defense method and device, and a system.

BACKGROUND

A distributed denial of service (DDoS) attack is a type of network attack method. A principle of the DDoS attack is that an attacker controls a large quantity of zombie hosts on a botnet to send a large quantity of packets to an attack target. As a result, the attack target consumes a large quantity of system resources to process the packets from the attacker and cannot respond to a service request from a legitimate user.

A protection device is usually disposed between the Internet and a protected network. The protection device can perform DDoS attack detection on traffic that passes through the protection device, and perform defense processing on the traffic when an attack exists to reduce or eliminate impact of the DDoS attack on the protected network. The protection device usually obtains statistics of traffic whose destination address is a single host, and then compares the statistics with a preset fixed detection threshold of the host, to determine whether the DDoS attack occurs. However, in some cases, the protection device cannot effectively detect the DDoS attack, resulting in a poor defense effect.

SUMMARY

This disclosure provides an attack defense method and device, and a system, to improve a defense effect of a protection device.

According to a first aspect, this disclosure provides an attack defense method. The method can be applied to a protection device or a server connected to the protection device. The protection device is deployed between the Internet and a protected network. Addresses in the protected network are divided into a plurality of address ranges that include a first address range and a second address range. The first address range and the second address range are of different granularities. In a possible implementation, the first address range is a proper subset of the second address range. In another possible implementation, the second address range is a proper subset of the first address range.

When the attack defense method provided in this disclosure is performed, the protection device or the server connected to the protection device collects statistics on first traffic that passes through the protection device, to obtain statistics of the first traffic. If the statistics of the first traffic exceed a first threshold, the protection device or the server connected to the protection device performs, via the protection device, defense processing on the first traffic that subsequently passes through the protection device. In this disclosure, the addresses of the protected network are divided into address ranges of different granularities. The protection device or the server connected to the protection device can perform attack detection on address ranges of a plurality of granularities, so that DDoS attacks on address ranges of various granularities can be effectively detected and discovered, and a defense effect of the protection device is improved.

In a possible implementation, if the statistics of the first traffic do not exceed the first threshold, the attack detection is performed on traffic whose destination address is an address range of another granularity. The protection device or the server connected to the protection device collects statistics on second traffic to obtain statistics of the second traffic. The second traffic is traffic, of a target type, that passes through the protection device, that is from the Internet, and whose destination address is the second address range in the protected network. When the statistics of the second traffic exceed a second threshold, the protection device or the server connected to the protection device performs, via the protection device, defense processing on the second traffic that subsequently passes through the protection device. In this way, the attack detection can be performed on the address ranges of different granularities, DDoS attacks in different attack ranges can be detected, DDoS attacks on the address ranges of the plurality of granularities can be effectively detected, and the defense effect of the protection device is improved.

In a possible implementation, the address ranges of the protected network can be divided into five granularities: all address ranges, a protection group, a network segment, a host group, and a host. All the address ranges include all address ranges of the protected network. All the address ranges of the protected network are also referred as an entire domain. The protection group includes a plurality of network segments in the protected network. The network segment is a continuous address space with a same subnet mask in the protected network. The host group includes a plurality of Internet Protocol (IP) addresses in one network segment in the protected network. The host is an IP address in the protected network.

Optically, the second address range is the proper subset of the first address range. In other words, the second address range is a part of the first address range.

In an example, the first address range is all the address ranges in the protected network, and the second address range includes the protection group, the network segment, the host group, or the host. In another example, the first address range is the protection group, and the second address range includes the network segment, the host group, or the host. In still another example, the first address range is the network segment, and the second address range includes the host group or the host. In yet another example, the first address range is the host group, and the second address range includes the host.

Optically, the first address range is the proper subset of the second address. In other words, the first address range is a part of the second address range.

In an example, the first address range is the host, and the second address range includes the host group, the network segment, the protection group, or all the address ranges in the protected network. In another example, the first address range is the host group, and the second address range includes the network segment, the protection group, or all the address ranges in the protected network. In still another example, the first address range is the network segment, and the second address range includes the protection group, or all the address ranges in the protected network. In yet another example, the first address range is the protection group, and the second address range is all the address ranges in the protected network.

In some possible implementations, before the protection device or the server connected to the protection device performs the attack detection on the second traffic, the protection device or the server connected to the protection device has performed the attack detection on traffic, of the target type, that passes through the protection device, that is from the Internet, and whose destination address is a third address range. Both the third address range and the first address range belong to the second address range, and are parts of the second address range. The protection device performs defense processing on the traffic, of the target type, whose destination address is the third address range. The traffic, of the target type, whose destination address belongs to the third address range is first defended traffic. When statistics collection is performed on the second traffic, impact of the first defended traffic needs to be excluded. The statistics, of the second traffic, obtained by the protection device or the server connected to the protection device by performing statistics collection on the second traffic do not include statistics of the first defended traffic. The statistics, of the second traffic, from which the statistics of the first defended traffic are excluded are more accurate. Whether an attack exists is determined based on the statistics of the second traffic, which can exclude interference from the first defended traffic, and improve accuracy of the attack detection.

In some possible implementations, before the protection device or the server connected to the protection device performs the attack detection on the first traffic, the protection device or the server connected to the protection device has performed the attack detection on traffic, of the target type, that passes through the protection device, that is from the Internet, and whose destination address is a fourth address range. The fourth address range is a part of the first address range. The protection device performs defense processing on the traffic, of the target type, whose destination address is the fourth address range. The traffic, of the target type, whose destination address belongs to the fourth address range is second defended traffic. When statistics collection is performed on the first traffic, impact of the second defended traffic needs to be excluded. The statistics, of first traffic, obtained by the protection device or the server connected to the protection device by performing statistics collection on the first traffic do not include statistics of the second defended traffic. The statistics, of first traffic, from which the statistics of the second defended traffic are excluded are more accurate. Whether an attack exists is determined based on the statistics of the first traffic, which can exclude interference from the second defended traffic, and improve accuracy of the attack detection.

In some possible implementations, in an example, traffic of the target type is traffic of a specified packet type. The packet type is, for example, a Transmission Control Protocol (TCP) packet, a User Datagram Protocol (UDP) packet, a synchronize sequence numbers (SYN) packet, a SYN acknowledgement (SYN-ACK) packet, an acknowledgement (ACK) packet, a terminate the connection (FIN) packet, a reset the connection (RST) packet, a Domain Name System (DNS) packet, a Hypertext Transfer Protocol (HTTP) packet, an Internet Control Message Protocol (ICMP) packet, an HTTP Secure (HTTPS) packet, or a Session Initiation Protocol (SIP) packet. In another example, traffic of the target type is traffic of a new session or traffic of a concurrent session.

According to a second aspect, this disclosure provides an attack defense apparatus. The apparatus can be used in a protection device or a server connected to the protection device. The protection device is deployed between the Internet and a protected network. The apparatus includes an obtaining unit and a processing unit. The obtaining unit is configured to collect statistics on first traffic that passes through the protection device, to obtain statistics of the first traffic. The first traffic is traffic, of a target type, that passes through the protection device, that is from the Internet, and whose destination address is a first address range in the protected network. Addresses in the protected network are divided into a plurality of address ranges that include the first address range. The plurality of address ranges further includes a second address range. The first address range and the second address range are of different granularities. The first address range is a proper subset of the second address range. Alternatively, the second address range is a proper subset of the first address range. The processing unit is configured to, in response to a case in which the statistics of the first traffic exceed a first threshold, perform, via the protection device, defense processing on the first traffic that subsequently passes through the protection device.

In some possible implementations, the obtaining unit is further configured to, in response to a case in which the statistics of the first traffic do not exceed the first threshold, collect statistics on second traffic to obtain statistics of the second traffic, where the second traffic is traffic, of the target type, that passes through the protection device, that is from the Internet, and whose destination address is the second address range in the protected network.

The processing unit is further configured to, in response to a case in which the statistics of the second traffic exceed a second threshold, perform, via the protection device, defense processing on the second traffic that subsequently passes through the protection device.

In some possible implementations, when the second address range is the proper subset of the first address range, if the first address range is all address ranges in the protected network, the second address range includes a protection group, a network segment, a host group, or a host, where the protection group includes a plurality of network segments in the protected network, the network segment is a continuous address space with a same subnet mask in the protected network, the host group includes a plurality of IP addresses in one network segment in the protected network, and the host is an IP address in the protected network, if the first address range is the protection group, the second address range includes the network segment, the host group, or the host, if the first address range is the network segment, the second address range includes the host group or the host, or if the first address range is the host group, the second address range includes the host.

In some possible implementations, when the first address range is the proper subset of the second address range in the plurality of address ranges, if the first address range is a host, the second address range includes a host group, a network segment, a protection group, or all address ranges in the protected network, where the protection group includes a plurality of network segments in the protected network, the network segment is a continuous address space with a same subnet mask in the protected network, the host group includes a plurality of IP addresses in one network segment in the protected network, and the host is an IP address in the protected network, if the first address range is the host group, the second address range includes the network segment, the protection group, or all the address ranges in the protected network, if the first address range is the network segment, the second address range includes the protection group or all the address ranges in the protected network, or if the first address range is the protection group, the second address range includes all the address ranges in the protected network.

In some possible implementations, the statistics of the second traffic do not include statistics of first defended traffic, the first defended traffic is traffic, of the target type, whose destination address belongs to a third address range, both the third address range and the first address range belong to the second address range, and the third address range does not overlap the first address range.

In some possible implementations, the statistics of the first traffic do not include statistics of second defended traffic, the second defended traffic is traffic, of the target type, whose destination address belongs to a fourth address range, and the fourth address range belongs to the first address range.

In some possible implementations, the target type includes a TCP packet, a UDP packet, a SYN packet, a SYN-ACK packet, an ACK packet, a FIN packet, an RST packet, a DNS packet, an HTTP packet, an ICMP packet, an HTTPS packet, or a SIP packet, or the target type includes a new session or a concurrent session.

According to a third aspect, this disclosure provides an attack defense device. The device includes a processor chip and a memory. The memory is configured to store instructions or program code, and the processor chip is configured to invoke and run the instructions or program code from the memory, to perform the attack defense method according to the first aspect.

According to a fourth aspect, this disclosure provides a computer-readable storage medium, including instructions, a program, or code. When the instructions, the program, or the code is executed on a computer, the computer is enabled to perform the attack defense method according to the first aspect.

According to a fifth aspect, this disclosure provides a chip, including a memory and a processor. The memory is configured to store instructions or program code. The processor is configured to invoke and run the instructions or program code from the memory, to perform the attack defense method according to the first aspect.

In a possible design, the chip includes only the processor. The processor is configured to read and execute the instructions or the program code stored in the memory. When the instructions or the program code is executed, the processor performs the attack defense method according to the first aspect.

According to a sixth aspect, this disclosure provides a computer program product. The computer program product includes one or more computer program instructions. When the computer program instructions are loaded and run by a management device, the management device is enabled to perform the attack defense method according to the first aspect.

DESCRIPTION OF EMBODIMENTS

To make the objectives, technical solutions, and advantages of this disclosure clearer, the following further describes the implementations of this disclosure in detail with reference to the accompanying drawings.

A DDoS attack is that an attacker controls a large quantity of zombie hosts on a botnet to send large-traffic data to an attack target, to exhaust system resources of the attack target. As a result, the attack target cannot respond to a normal service request. A protection device collects statistics on traffic that flows to a single host or even traffic that flows to a specific port of a single host. The protection device compares traffic statistics that is obtained through statistics collection with a fixed detection threshold. When the traffic statistics exceed the detection threshold, the protection device determines that the DDoS attack occurs.

Figure 1A:
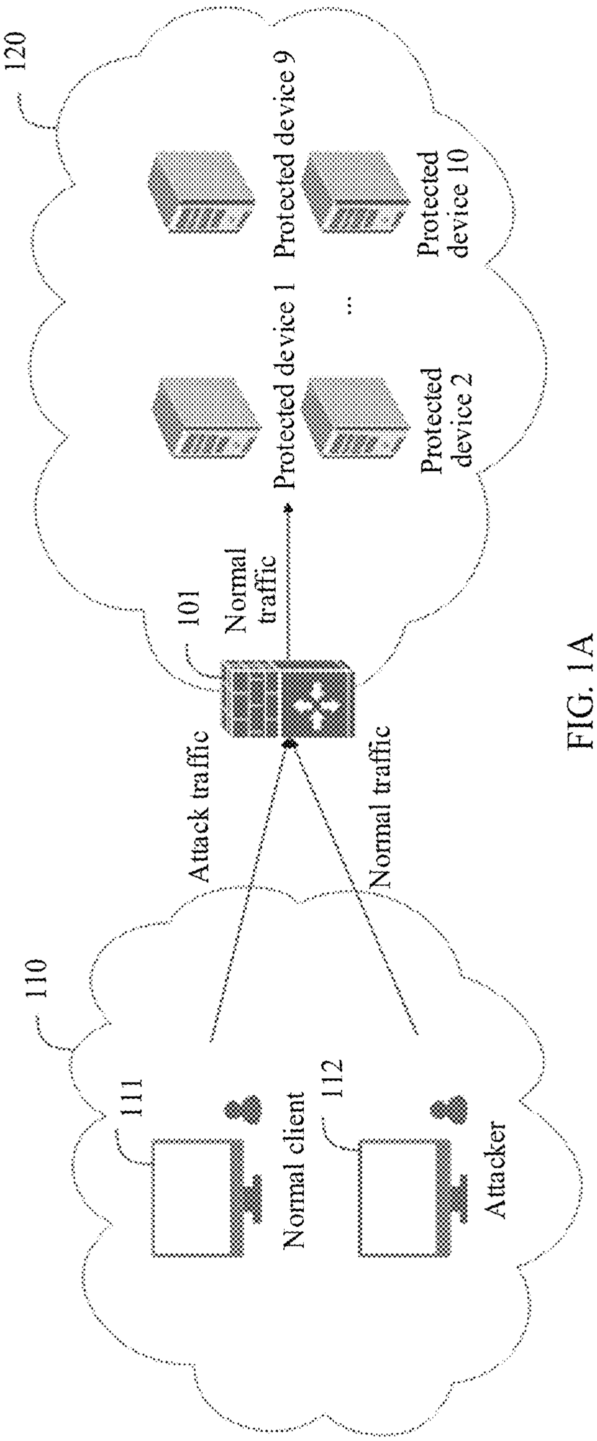
FIG. 1A is a schematic diagram of a network architecture according to an embodiment of this disclosure.

FIG. 1A is a schematic diagram of a network architecture according to an embodiment of this disclosure. As shown in FIG. 1A, a network includes the Internet 110, a protection device 101, and a protected network 120.

The Internet 110 includes a normal client 111 and an attacker 112. The normal client 111 is an initiator of normal traffic. The normal client 111 generates the normal traffic and sends the normal traffic to a protected device that is in the protected network 120. The attacker 112 generates and sends attack traffic to the protected device via a tool, a zombie host, or a proxy.

The protection device 101 is deployed between the Internet 110 and the protected network 120. To be specific, the protection device 101 is deployed at a boundary of the protected network 120, and is configured to protect the protected device in the protected network 120 from an attack. The protection device 101 performs security detection on traffic that enters the protected network 120, to determine whether the traffic is the normal traffic or the attack traffic. The protection device 101 blocks the attack traffic to ensure security of the protected device, and forwards the normal traffic to ensure that the protected device can normally process a service. The protection device 101 includes but is not limited to integration of one or more of a firewall, a security gateway, a router, a switch, an intrusion detection system (IDS)-type device, an intrusion prevention system (IPS)-type device, a unified threat management (UTM) device, an anti-virus (AV) device, an anti-DDoS attack device, and a next-generation firewall (NGFW).

The protected network 120 may be a local area network (LAN), or may be a network that includes a plurality of LANs. The protected network 120 includes a protected device 1 to a protected device 10. The protected device 1 to the protected device 10 are network-connected devices such as protected servers or hosts.

The following describes a protection process of the protection device with reference to FIG. 1A.

When the attacker 112 attacks a single device, for example, the protected device 1, the attacker 112 generates a large quantity of traffic A whose destination address is an IP address 1 of the protected device 1. The normal client 111 generates traffic B whose destination address is the IP address 1 of the protected device 1. The traffic A and the traffic B are sent to the protected device 1 in the protected network 120 via the protection device 101. The protection device 101 collects statistics on the traffic A and the traffic B whose destination addresses are the IP address 1, to obtain traffic statistics A. The protection device 101 compares the traffic statistics A with a fixed pre-determined detection threshold of a single protected device, and determines that the traffic statistics A are greater than the detection threshold. The protection device 101 determines that the attacker 112 performs a DDoS attack on the protected device 1. The protection device 101 performs defense processing on the traffic A and the traffic B that subsequently pass through the protection device 101 and whose destination addresses are the IP address 1. Further, the protection device can clean the attack traffic A generated by the attacker 112, and pass the normal traffic B generated by the normal client 111.

However, when the attacker 112 uses a carpet-bombing attack manner, the attacker 112 simultaneously initiates attacks to IP addresses included in one or more network segments. For example, the IP address 1 of the protected device 1 to an IP address 4 of the protected device 4 in the protected network 120 belong to a same network segment. The attacker 112 initiates a small-traffic attack on each IP address included in the network segment, and sends attack traffic to the protected device 1 to the protected device 4 separately. The protection device 101 separately performs statistics collection on statistics of traffic that flows to the IP address 1 to the IP address 4, to obtain statistics of traffic whose destination address is a single IP address. Four statistics obtained by the protection device 101 through statistics collection are slightly small, and may not exceed the specified detection threshold. In this way, it is difficult for the protection device 101 to detect a DDoS attack. When there is a large quantity of protected devices that are attacked, a total amount of the attack traffic sent by the attacker 112 is large. This easily causes a loss of a link bandwidth for transmitting traffic, also causes overload of a central processing unit (CPU) of the protection device 101, and affects protection performance of the protection device.

A rate limiting manner or a manner of reducing the detection threshold of the protection device is usually used to defend against a DDoS attack in the carpet-bombing manner. The rate limiting manner is to limit a rate of traffic that flows to a network segment that may be attacked. However, this may affect normal traffic transmission. If the method of reducing the detection threshold of the protection device is used, the detection threshold may be too small, and as a result, normal traffic may also trigger the protection device to perform defense.

It can be learned from the foregoing content that, in a manner in which the protection device performs detection for an IP address of a single protected device, it is difficult to detect the DDoS attack accurately, and consequently, defense processing cannot be performed for the DDoS attack, and network security is affected.

On this basis, embodiments of this disclosure provide an attack defense method and device, and a system. In the attack defense method provided in embodiments of this disclosure, a protected network is divided into at least two address range granularities of different sizes. For example, addresses in the protected network are divided into a plurality of address ranges that include a first address range and a second address range. The first address range is a proper subset of the second address range, or the second address range is a proper subset of the first address range. A protection device or a server connected to the protection device can collect statistics on first traffic that passes through the protection device, to obtain statistics of the first traffic. When the statistics of the first traffic exceed a first threshold, the protection device performs defense processing on the first traffic. The first traffic is traffic, of a target type, whose destination address is the first address range. The first address range and the second address range are address ranges of different granularities. The protection device can flexibly collect statistics on traffic whose destination address belongs to address ranges of various granularities, so that DDoS attacks on the address ranges of various granularities are effectively detected and discovered, and a defense effect of the protection device is improved.

In addition, the first address range may be an address range that includes a plurality of IP addresses. The protection device or the server connected to the protection device can detect traffic that flows to a plurality of IP addresses. This saves, to some extent, resources used by the protection device for attack defense. Particularly, when the protected network includes a large quantity of IP addresses, compared with a method for detecting traffic that flows to a single IP address, the attack defense method provided in embodiments of this disclosure can alleviate pressure of insufficient resources for attack defense.

The attack defense method provided in embodiments of this disclosure can be applied to the network scenario shown in FIG. 1A.

Figure 1B:
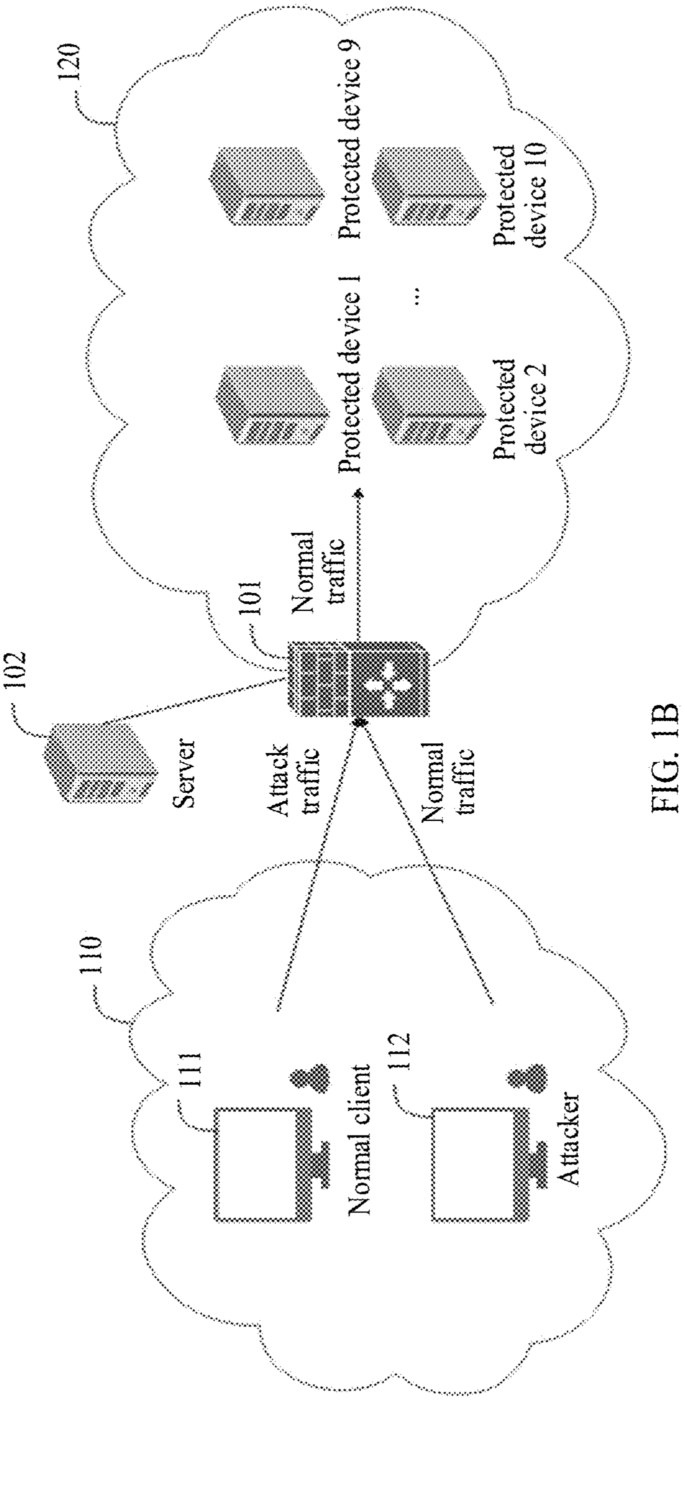
FIG. 1B is a schematic diagram of another network architecture according to an embodiment of this disclosure.

In addition, an embodiment of this disclosure further provides a network scenario to which an attack defense method is applicable. FIG. 1B is a schematic diagram of another network architecture according to an embodiment of this disclosure. In the network architecture, a protection device 101 is further connected to a server 102. The server 102 can collect statistics on traffic that passes through the protection device 101, and determine, based on a statistical result, whether to trigger the protection device 101 to perform defense.

The following describes the attack defense method provided in embodiments of this disclosure.

It should be first noted that a protected network includes a plurality of protected devices. Each protected device has a corresponding IP address. IP addresses included in the protected network are divided into a plurality of address ranges. Different address ranges include different IP addresses. The plurality of address ranges obtained through division include a first address range and a second address range that are of different granularities. In a possible implementation, the first address range is a proper subset of the second address range. In other words, the first address range is a part of the second address range. Alternatively, in another possible implementation, the second address range is a proper subset of the first address range, in other words, the second address range is a part of the first address range.

A manner of dividing address ranges of different granularities is not limited in embodiments of this disclosure, and the address ranges include at least two granularities. In an example, the IP addresses included in the protected network can be divided into address ranges of five granularities: an entire domain, a protection group, a network segment, a host group, and a host. The entire domain includes all address ranges in the protected network. The protection group includes a plurality of network segments in the protected network. The network segment is a continuous address space with a same subnet mask in the protected network. The host group includes a plurality of IP addresses in the network segment in the protected network. The host is an IP address in the host group.

The protected network shown in FIG. 1A is used as an example. The protected network includes the protected device 1 to the protected device 10. IP addresses of the protected device 1 to the protected device 4 are 192.168.0.1, 192.168.0.2, 192.168.0.3, and 192.168.0.4 respectively. IP addresses of the protected device 5 to the protected device 7 are 192.168.1.1, 192.168.1.2, and 192.168.1.3 respectively. IP addresses of the protected device 8 to the protected device 10 are 192.168.2.1, 192.168.2.2, and 192.168.2.3 respectively.

The network segment is a continuous address space with a same subnet mask in the protected network. The IP addresses of the protected device 1 to the protected device 4 belong to a network segment 192.168.0.0/24. The IP addresses of the protected device 5 to the protected device 7 belong to a network segment 192.168.1.0/24. The IP addresses of the protected device 8 to the protected device 10 belong to a network segment 192.168.2.0/24.

Based on different granularities, the addresses in the protected network can be divided into different address ranges. In an example, the addresses in the protected network can be divided into address ranges of five granularities: an entire domain, a protection group, a network segment, a host group, and a host.

The entire domain is all address ranges in the protected network. The address range obtained through division based on the entire domain includes IP addresses of all of the protected device 1 to the protected device 10. The protection group includes a plurality of network segments in the protected network. For example, a protection group A includes the network segment 192.168.0.0/24 and the network segment 192.168.1.0/24 in the protected network. The network segment is a single network segment on the protected network. The protected network includes three network segments: the network segment 192.168.0.0/24, the network segment 192.168.1.0/24, and the network segment 192.168.2.0/24. The host group includes a plurality of IP addresses that belong to one network segment. For example, a host group A includes the IP address of the protected device 1 and the IP address of the protected device 2. A host group B includes the IP address of the protected device 3 and the IP address of the protected device 4. A host group C includes the IP address of the protected device 5 and the IP address of the protected device 6. A host group D includes the IP address of the protected device 8 and the IP address of the protected device 10. The host is an IP address in the protected network. 10 hosts can be obtained by dividing addresses included in the protected network based on a granularity of hosts.

Figure 2:
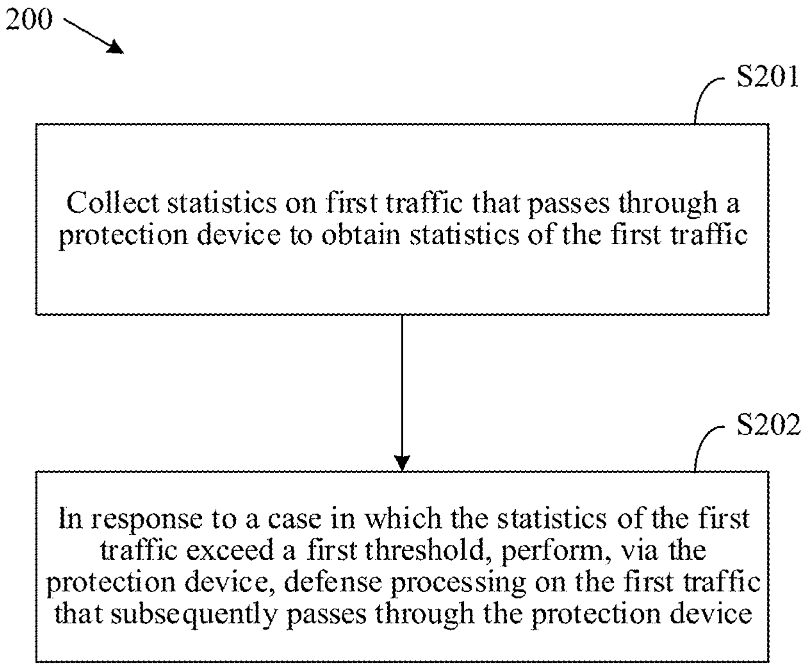
FIG. 2 is a flowchart of an attack defense method according to an embodiment of this disclosure.

FIG. 2 is a flowchart of an attack defense method 200 according to an embodiment of this disclosure. It should be noted that, in a possible implementation, a protection device performs the following attack defense method 200. For example, refer to FIG. 1A. The protection device 101 can perform the following S201 and S202. In another possible implementation, a server connected to the protection device performs the following attack defense method 200. For example, refer to FIG. 1B. The server 102 can perform the following S201 and S202.

The attack defense method 200 includes steps S201 and S202.

Step S201: Collect statistics on first traffic that passes through the protection device to obtain statistics of the first traffic.

The first traffic is traffic, of a target type, that passes through the protection device and that is from the Internet. The first traffic is traffic that requires security verification. The first traffic may be normal traffic generated by a normal client, or may be attack traffic generated by an attacker, or may alternatively include normal traffic generated by a normal client and attack traffic generated by an attacker.

In an example, the traffic of the target type is traffic of a specified packet type. The statistics of the first traffic are a quantity of packets or a packet arrival rate. The packet arrival rate is, for example, a packet per second (pps) or bits per second (bps).

The target type includes a TCP packet, a UDP packet, a SYN packet, a SYN-ACK packet, an ACK packet, a FIN packet, an RST packet, a DNS packet, an HTTP packet, an ICMP packet, an HTTPS packet, a SIP packet, or the like.

In another example, the traffic of the target type is traffic of a session. The target type includes a new session or a concurrent session. Correspondingly, the statistics of the first traffic are a quantity of new sessions or a quantity of concurrent sessions.

A destination address of the first traffic is a first address range in a protected network. A specific manner of dividing address ranges in the protected network is not limited in embodiments of this disclosure. The foregoing manner of dividing the address ranges in the protected network is used as an example, and the first address range is one of address ranges of five granularities: an entire domain, a protection group, a network segment, a host group, and a host.

The protection device or the server connected to the protection device collects statistics on the first traffic that passes through the protection device, to obtain the statistics of the first traffic.

Further, the protection device or the server connected to the protection device performs continuous statistics collection on the first traffic based on a first time period. The first time period is one or more unit statistical periods. A length of the first time period can be set based on a statistical requirement. For example, the first time period is one second, one minute, or five minutes.

In a possible implementation, before performing statistics collection on the statistics of the first traffic, the protection device has performed defense processing on some traffic. The traffic on which the defense processing has been performed is referred to as defended traffic.

For example, the protection device has performed defense processing on traffic, of the target type, whose destination address is a fourth address range. The fourth address range belongs to the first address range, and is a part of the first address range. In other words, the fourth address range is an address range, of a finer granularity, that belongs to the first address range. To distinguish between different defended traffic, in embodiments of this disclosure, the traffic, of the target type, on which the defense processing has been performed and whose destination address is the fourth address range is referred to as second defended traffic. The statistics, of the first traffic, obtained through statistics collection performed by the protection device or the server connected to the protection device do not include statistics of the second defended traffic.

The foregoing address range division manner is used as an example. For example, the first address range is a host group that includes a host A, a host B, and a host C. The fourth address range is the host A. After the protection device determines to perform defense processing on traffic, of the target type, whose destination address is the host A, the traffic, of the target type, whose destination address is the host A is the second defended traffic. When collecting statistics on the first traffic, the protection device or the server connected to the protection device excludes the statistics of the second defended traffic. The statistics, of the first traffic, obtained through statistics collection are statistics of first traffic that flows to an address range other than the host A in the first address range, namely, statistics of traffic whose destination addresses are the host B and the host C.

In this way, repeated statistics collection on the statistics of the second defended traffic can be avoided, and effectiveness of attack defense detection can be improved.

Step S202: In response to a case in which the statistics of the first traffic exceed a first threshold, perform, via the protection device, defense processing on the first traffic that subsequently passes through the protection device.

The first threshold is a preset threshold of the statistics of the first traffic. In a possible implementation, the first threshold is determined based on the first address range and a DDoS attack status. When the statistics of the first traffic exceed the first threshold, the protection device or the server connected to the protection device can determine that a DDoS attack exists. The protection device performs the defense processing on the first traffic that subsequently passes through the protection device.

Further, an example in which the first time period is the 1st second is used. The protection device collects statistics on the first traffic that passes through the protection device in the 1st second, to obtain the statistics of the first traffic. After determining that the statistics of the first traffic exceed the first threshold, the protection device performs the defense processing on the first traffic that passes through the protection device in a time period after the first time period. For example, the protection device performs the defense processing on the first traffic that passes through the protection device in the 2nd second.

A specific operation of performing, by the protection device, the defense processing on the first traffic that subsequently passes through the protection device is not limited in embodiments of this disclosure. In some possible implementations, the protection device pre-configures a defense policy corresponding to the traffic of the target type and a specific attack form of the DDoS attack. For example, the first traffic is SYN packet traffic. A flood attack occurs on the SYN packet traffic, and the protection device uses first-packet discarding and source IP address detection technologies to clean attack traffic included in the first traffic. The flood attack is an attack form of the DDoS attack. For another example, the first traffic is HTTP packet traffic. A flood attack occurs on the HTTP packet traffic, and the protection device uses redirection and verification code technologies to clean attack traffic.

Based on the attack defense method in the foregoing embodiment, when the statistics of the first traffic exceed the first threshold, the protection device can perform the defense processing on the first traffic that subsequently passes through the protection device. In some possible implementations, the statistics of the first traffic do not exceed the first threshold, in other words, the first traffic can pass security detection. Further, the protection device or the server connected to the protection device performs the security detection on second traffic. A granularity of an address range of a destination address of the second traffic is different from a granularity of an address range of a destination address of the first traffic. Detection is performed on traffic whose destination addresses are address ranges of different granularities. This can discover DDoS attacks on the address ranges of different granularities and improve security of the protected network.

Figure 3:
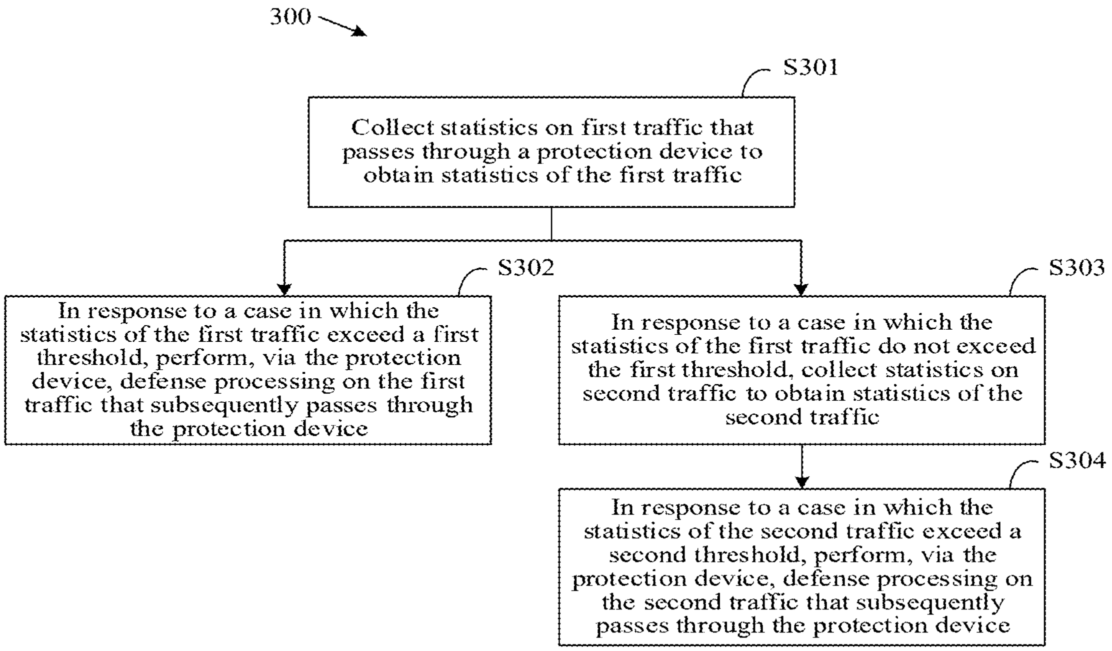
FIG. 3 is a schematic flowchart of another attack defense method according to an embodiment of this disclosure.

FIG. 3 is a schematic flowchart of another attack defense method 300 according to an embodiment of this disclosure. The attack defense method 300 includes the following steps.

Step S301: Collect statistics on first traffic that passes through a protection device to obtain statistics of the first traffic.

Step S302: In response to a case in which the statistics of the first traffic exceed a first threshold, perform, via the protection device, defense processing on the first traffic that subsequently passes through the protection device.

Steps S301 and S302 are respectively similar to steps S201 and S202 in the attack defense method 200. For specific descriptions, refer to the foregoing descriptions. Details are not described herein again.

Step S303: In response to a case in which the statistics of the first traffic do not exceed the first threshold, collect statistics on second traffic to obtain statistics of the second traffic.

When the statistics of the first traffic do not exceed the first threshold, the protection device or a server connected to the protection device collects statistics on the second traffic, to obtain the statistics of the second traffic.

The second traffic is traffic, of a target type, whose destination address is a second address range in a protected network. The second traffic and the first traffic are traffic of the same target type.

The second address range and a first address range are different.

In a possible implementation, the second address range is a part of the first address range, in other words, the second address range is in the first address range and is of a smaller granularity. For example, addresses of the protected network can be divided into at least two of five granularities: an entire domain, a protection group, a network segment, a host group, and a host. The first address range is any one of the entire domain, the protection group, the network segment, and the host group. The second address range is an address range whose granularity is less than a granularity of the first address range.

For example, the first address range is the entire domain, and the second address range is one of the protection group, the network segment, the host group, and the host. The first address range is the protection group, and the second address range is the network segment, the host group, or the host in the first address range. The first address range is the network segment, and the second address range is the host group or the host in the first address range. The first address range is the host group, and the second address range is the host in the first address range.

In another possible implementation, the first address range is a part of the second address range, in other words, the second address range includes the first address range and is of a larger granularity. For example, addresses of the protected network can be divided into the at least two of five granularities: an entire domain, a protection group, a network segment, a host group, and a host. The first address range is any one of the protection group, the network segment, the host group, and the host. The second address range is an address range whose granularity is larger than a granularity of the first address range.

For example, the first address range is the host, and the second address range is one of the entire domain, the protection group, the network segment, and the host group that include the first address range. The first address range is the host group, and the second address range is the entire domain, and the protection group or the network segment that includes the first address range. The first address range is the network segment, and the second address range is the entire domain or the protection group that includes the first address range. The first address range is the protection group, and the second address range is the entire domain.

Based on the obtained statistics of the second traffic, the protection device or the server connected to the protection device can perform security detection on traffic whose destination address is the second address range. In this way, detection is performed on traffic whose destination addresses are address ranges of different granularities. This improves effectiveness of attack detection and improves a defense effect.

A manner of collecting statistics on the second traffic is not limited in embodiments of this disclosure. In a possible implementation, the protection device or the server connected to the protection device can collect statistics on the first traffic and the second traffic in a same statistical period. For example, the statistics of the first traffic are obtained by collecting statistics on the first traffic in a first time period. The protection device or the server connected to the protection device can further collect statistics on the second traffic in the first time period, to obtain the statistics of the second traffic. In another possible implementation, the second traffic is collected in a subsequent statistical period of a first time period, to obtain the statistics of the second traffic. For example, the statistics of the first traffic are obtained by collecting statistics on the first traffic in the first time period. The protection device or the server connected to the protection device can collect statistics on the second traffic in a third time period, to obtain the statistics of the second traffic. The third time period is a subsequent statistical period of the first time period.

In a possible implementation, the first address range is a part of the second address range. Before performing statistics collection on the statistics of the second traffic, the protection device has performed defense processing on a part of traffic. The traffic on which the defense processing has been performed is referred to as defended traffic. To distinguish between different defended traffic, in embodiments of this disclosure, traffic, of the target type, on which the defense processing has been performed and whose destination address is a third address range is referred to as first defended traffic. The statistics of the second traffic do not include statistics of the first defended traffic. The first defended traffic is the traffic, of the target type, whose destination address is the third address range. Both the third address range and the first address range belong to the second address range. The third address range and the first address range do not overlap. For example, the first address range is a host A, the third address range is a host B, and the second address range is a host group that includes the host A and the host B. After the protection device performs defense processing on traffic, of the target type, that flows to the host B, when the protection device or the server connected to the protection device collects statistics on the second traffic, the protection device or the server connected to the protection device excludes statistics of the traffic that flows to the host B, and collects statistics on only traffic that flows to the host A.

In this way, repeated statistics collection on the statistics of the first defended traffic can be avoided, interference of the first defended traffic in attack detection of the second traffic can be excluded or reduced, and accuracy of attack defense can be improved.

Step S304: In response to a case in which the statistics of the second traffic exceed a second threshold, perform, via the protection device, defense processing on the second traffic that subsequently passes through the protection device.

The second threshold is a preset threshold of the statistics corresponding to the second traffic. In a possible implementation, the first threshold is determined based on the second address range and a DDoS attack status. When the statistics of the second traffic exceed the second threshold, the protection device or the server connected to the protection device can determine that a DDoS attack exists. The protection device performs the defense processing on the second traffic that passes through the protection device after a statistical period.

For example, a first time period for collecting statistics on the second traffic is the 1 st second, and the protection device collects statistics on the second traffic that passes through the protection device in the 1st second, to obtain the statistics of the second traffic. After determining that the statistics of the second traffic exceed the second threshold, the protection device performs the defense processing on the second traffic that passes through the protection device in a time period after the first time period. For example, the protection device performs the defense processing on the second traffic that passes through the protection device in the 2nd second.

The following describes the attack defense method 300 by using an example.

In an example, a protection device can perform security detection in a coarse-to-fine order of granularities of address ranges of destination addresses of traffic. The protection device performs the security detection on traffic in an order of an entire domain, a protection group, a network segment, a host group, and a host that are address ranges of destination addresses of the traffic.

Figure 4:
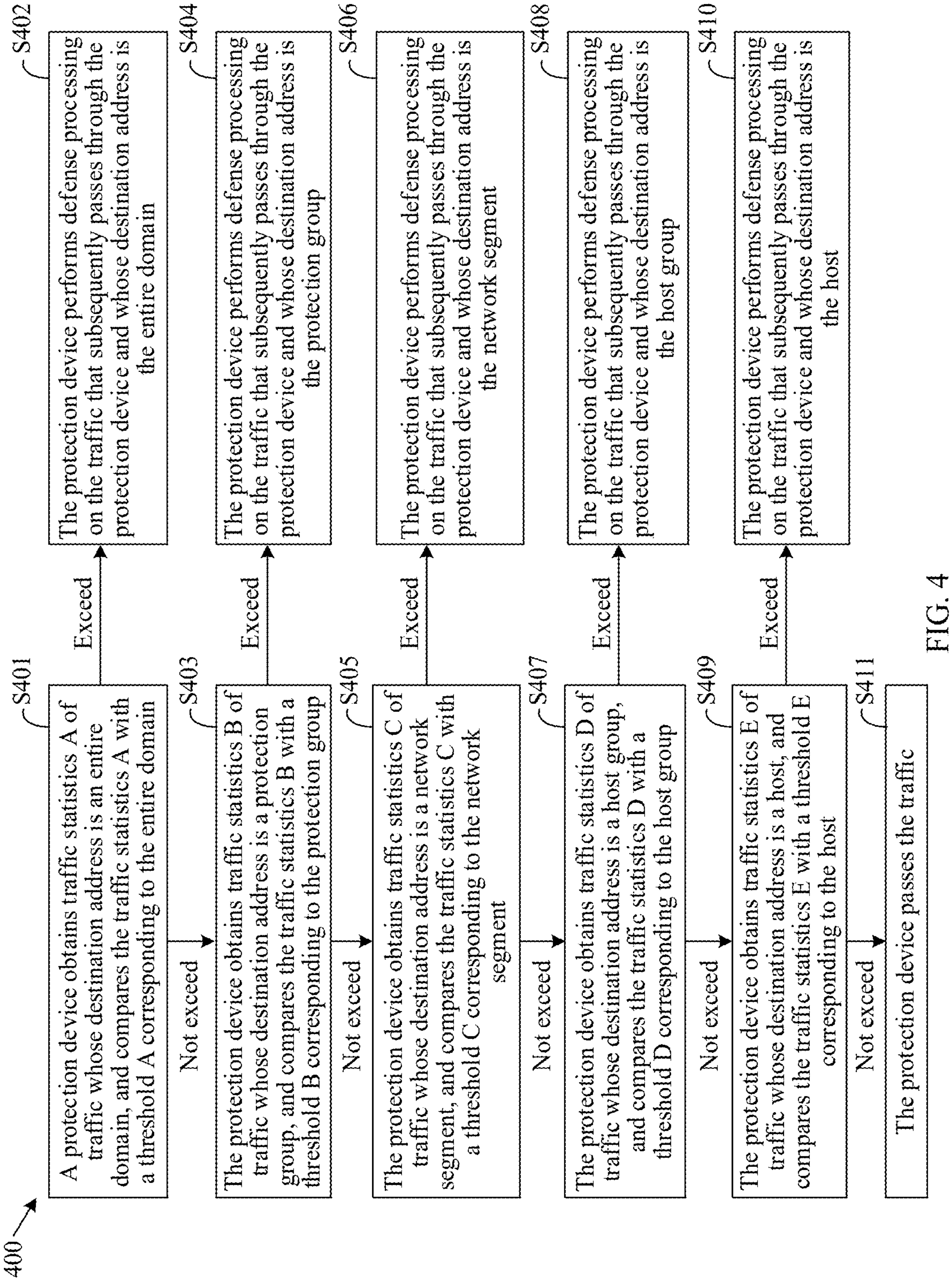
FIG. 4 is a schematic flowchart of still another attack defense method according to an embodiment of this disclosure.

FIG. 4 is a schematic flowchart of still another attack defense method 400 according to an embodiment of this disclosure. The method 400 includes steps S401 to S411.

Step S401: A protection device obtains traffic statistics A of traffic whose destination address is an entire domain, and compares the traffic statistics A with a threshold A corresponding to the entire domain.

If the traffic statistics A exceed the threshold A, step S402 is performed. If the traffic statistics A do not exceed the threshold A, step S403 is performed.

Step S402: The protection device performs defense processing on the traffic that subsequently passes through the protection device and whose destination address is the entire domain.

Step S403: The protection device obtains traffic statistics B of traffic whose destination address is a protection group, and compares the traffic statistics B with a threshold B corresponding to the protection group.

If the traffic statistics B exceed the threshold B, step S404 is performed. If the traffic statistics B do not exceed the threshold B, step S405 is performed.

Step S404: The protection device performs defense processing on the traffic that subsequently passes through the protection device and whose destination address is the protection group.

Step S405: The protection device obtains traffic statistics C of traffic whose destination address is a network segment, and compares the traffic statistics C with a threshold C corresponding to the network segment.

If the traffic statistics C exceed the threshold C, step S406 is performed. If the traffic statistics C do not exceed the threshold C, step S407 is performed.

Step S406: The protection device performs defense processing on the traffic that subsequently passes through the protection device and whose destination address is the network segment.

Step S407: The protection device obtains traffic statistics D of traffic whose destination address is a host group, and compares the traffic statistics D with a threshold D corresponding to the host group.

If the traffic statistics D exceed the threshold D, step S408 is performed. If the traffic statistics D do not exceed the threshold D, step S409 is performed.

Step S408: The protection device performs defense processing on the traffic that subsequently passes through the protection device and whose destination address is the host group.

Step S409: The protection device obtains traffic statistics E of traffic whose destination address is a host, and compares the traffic statistics E with a threshold E corresponding to the host.

If the traffic statistics E exceed the threshold E, step S410 is performed. If the traffic statistics E do not exceed the threshold E, step S411 is performed.

Step S410: The protection device performs defense processing on the traffic that subsequently passes through the protection device and whose destination address is the host.

Step S411: The protection device passes the traffic.

The first address range is any one of the entire domain, the protection group, the network segment, and the host group. The second address range is an address range whose granularity is less than a granularity of the first address range.

For example, the first address range is the entire domain, and the second address range is the protection group. The first address range is the protection group, and the second address range is the network segment. The first address range is the network segment, and the second address range is the host group. The first address range is the host group, and the second address range is the host.

The following uses an example for description with reference to the scenario shown in FIG. 1A and FIG. 1B.

The protected network 120 is used as an example. IP addresses of the protected device 1 to the protected device 10 included in the protected network can be divided into address ranges of five granularities: an entire domain, a protection group, a network segment, a host group, and a host. The protection device detects traffic whose target type is a SYN packet. The protection device collects statistics on traffic whose destination addresses are the entire domain, a protection group A, a network segment 192.168.0.0/24, a host group A, a host 192.168.0.1, a host 192.168.0.2, a host 192.168.0.3, and a host 192.168.0.4.

The protection device separately collects, in a first time period, statistics on the traffic whose destination addresses are the entire domain, the protection group A, the network segment 192.168.0.0/24, the host group A, the host 192.168.0.1, and the host 192.168.0.2, to obtain corresponding traffic statistics. For details about the obtained traffic statistics, refer to Table 1.

TABLE 1

| Entire domain | Protection group | Network segment | Host group | Host | Traffic statistics |
|---|---|---|---|---|---|
| | | | | | 4800 pps |
| | Protection group A | | | | 1800 pps |
| | | 192.168.0.0/24 | | | 1200 pps |
| | | | Host group A | | 700 pps |
| | | | | 192.168.0.1 | 300 pps |
| | | | | 192.168.0.2 | 600 pps |

A threshold of the traffic statistics corresponding to the entire domain is 10000 pps. A threshold of the traffic statistics corresponding to the protection group is 2000 pps. A threshold of the traffic statistics corresponding to the network segment is 800 pps. A threshold of the traffic statistics corresponding to the host group is 600 pps. A threshold of the traffic statistics corresponding to the host is 500 pps.

In an example, the protection device can perform security detection in a coarse-to-fine order of granularities of address ranges of destination addresses of traffic. The protection device performs attack defense in an order of the entire domain, the protection group, the network segment, the host group, and the host that are address ranges of destination addresses. The attack defense includes the following steps.

A1: The protection device obtains the traffic statistics 4800 pps of the traffic whose destination address is the entire domain, and compares 4800 pps with the threshold 10000 pps of the traffic statistics corresponding to the entire domain.

A2: The traffic statistics 4800 pps of the traffic of the entire domain are less than 10000 pps.

A3: The protection device obtains the traffic statistics 1800 pps of the traffic whose destination address is the protection group A, and compares 1800 pps with the threshold 2000 pps of the traffic statistics corresponding to the protection group.

A4: The traffic statistics 1800 pps of the traffic of the protection group A are less than 2000 pps.

A5: The protection device obtains the traffic statistics 1200 pps of the traffic whose destination address is the network segment 192.168.0.0/24, and compares 1200 pps with the threshold 800 pps of the traffic statistics corresponding to the network segment.

A6: The traffic statistics 1200 pps of the traffic of the network segment 192.168.0.0/24 are greater than 800 pps. The protection device performs defense processing on the traffic that subsequently passes through the protection device and whose destination address is the network segment 192.168.0.0/24.

In another example, the protection device can perform security detection in a fine-to-coarse order of granularities of address ranges of destination addresses of traffic. The protection device performs the security detection on traffic in an order of a host, a host group, a network segment, a protection group, and an entire domain that are address ranges of destination addresses of the traffic.

Figure 5:
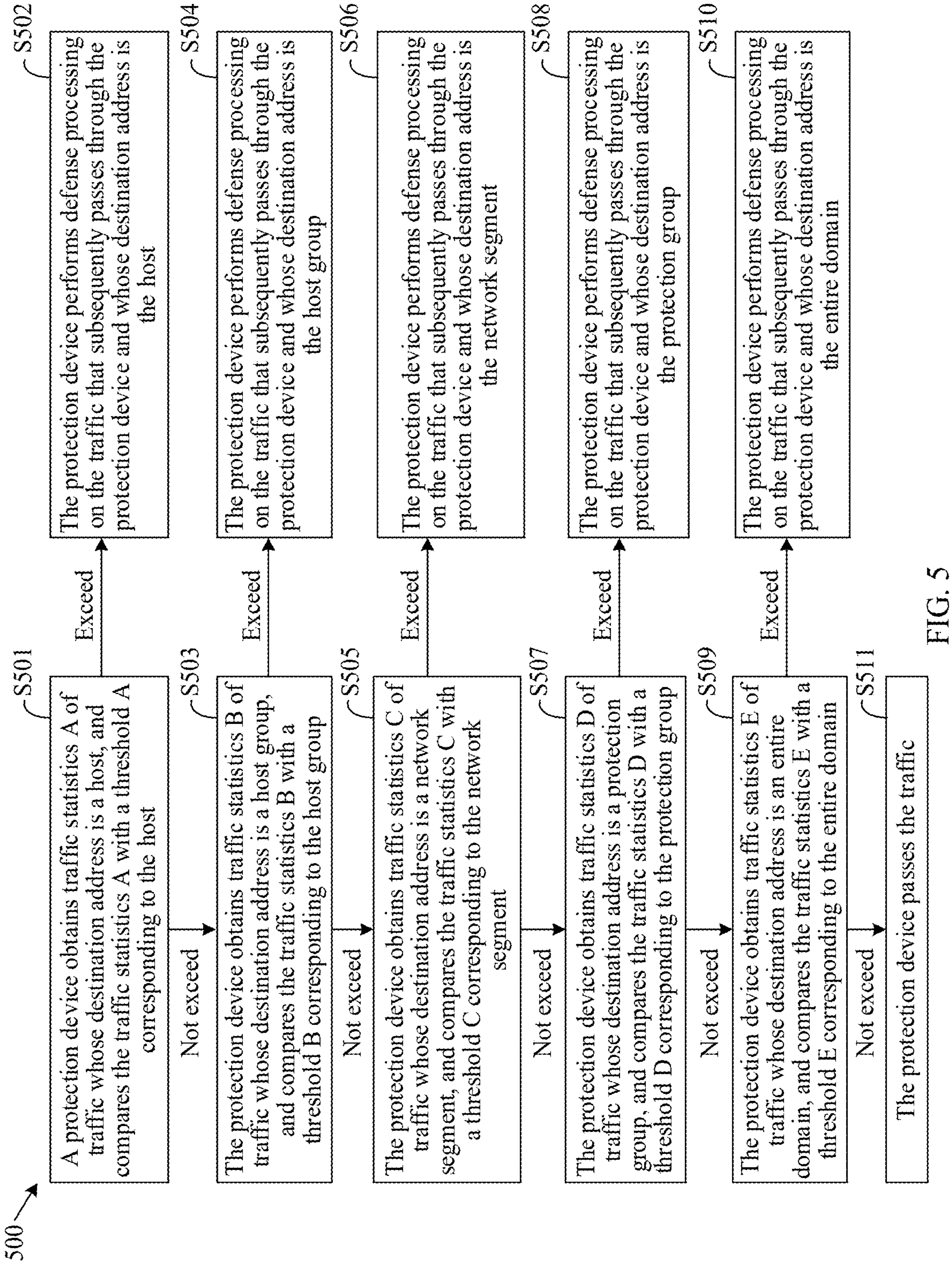
FIG. 5 is a schematic flowchart of yet another attack defense method according to an embodiment of this disclosure.

FIG. 5 is a schematic flowchart of yet another attack defense method 500 according to an embodiment of this disclosure. The method 500 includes steps S501 to S511.

Step S501: A protection device obtains traffic statistics A of traffic whose destination address is a host, and compares the traffic statistics A with a threshold A corresponding to the host.

If the traffic statistics A exceed the threshold A, step S502 is performed. If the traffic statistics A do not exceed the threshold A, step S503 is performed.

Step S502: The protection device performs defense processing on the traffic that subsequently passes through the protection device and whose destination address is the host.

Step S503: The protection device obtains traffic statistics B of traffic whose destination address is a host group, and compares the traffic statistics B with a threshold B corresponding to the host group.

If the traffic statistics B exceed the threshold B, step S504 is performed. If the traffic statistics B do not exceed the threshold B, step S505 is performed.

Step S504: The protection device performs defense processing on the traffic that subsequently passes through the protection device and whose destination address is the host group.

Step S505: The protection device obtains traffic statistics C of traffic whose destination address is a network segment, and compares the traffic statistics C with a threshold C corresponding to the network segment.

If the traffic statistics C exceed the threshold C, step S506 is performed. If the traffic statistics C do not exceed the threshold C, step S507 is performed.

Step S506: The protection device performs defense processing on the traffic that subsequently passes through the protection device and whose destination address is the network segment.

Step S507: The protection device obtains traffic statistics D of traffic whose destination address is a protection group, and compares the traffic statistics D with a threshold D corresponding to the protection group.

If the traffic statistics D exceed the threshold D, step S508 is performed. If the traffic statistics D do not exceed the threshold D, step S509 is performed.

Step S508: The protection device performs defense processing on the traffic that subsequently passes through the protection device and whose destination address is the protection group.

Step S509: The protection device obtains traffic statistics E of traffic whose destination address is an entire domain, and compares the traffic statistics E with a threshold E corresponding to the entire domain.

If the traffic statistics E exceed the threshold E, step S510 is performed. If the traffic statistics E do not exceed the threshold E, step S511 is performed.

Step S510: The protection device performs defense processing on the traffic that subsequently passes through the protection device and whose destination address is the entire domain.

Step S511: The protection device passes the traffic.

A first address range is any one of the protection group, the network segment, the host group, and the host. A second address range is an address range whose granularity is larger than a granularity of the first address range.

For example, the first address range is the host, and the second address range is the host group. The first address range is the host group, and the second address range is the network segment. The first address range is the network segment, and the second address range is the protection group. The first address range is the protection group, and the second address range is the entire domain.

The following uses an example for description with reference to the scenario shown in FIG. 1A and FIG. 1B. The traffic statistics shown in Table 1 are used as an example. The protection device performs attack defense in an order of a host, a host group, a network segment, a protection group, and an entire domain that are address ranges of destination addresses. The attack defense method includes the following steps.

B1: The protection device obtains the traffic statistics 600 pps of the traffic whose destination address is the host 192.168.0.2, and compares 600 pps with the threshold 500 pps of the traffic statistics corresponding to the host.

B2: The traffic statistics 600 pps of the traffic of the host 192.168.0.2 are greater than 500 pps. The protection device performs defense processing on the traffic that subsequently passes through the protection device and whose destination address is the host 192.168.0.2.

B3: The protection device obtains the traffic statistics 300 pps of the traffic whose destination address is the host 192.168.0.1, and compares 300 pps with the threshold 500 pps of the traffic statistics corresponding to the host.

B4: The traffic statistics 300 pps of the traffic of the host 192.168.0.1 are less than 500 pps.

B5: The protection device obtains the traffic statistics 1200 pps of the traffic whose destination address is the network segment 192.168.0.0/24, and compares 1200 pps with the threshold 800 pps of the traffic statistics corresponding to the network segment.

B6: The traffic statistics 1200 pps of the traffic of the network segment 192.168.0.0/24 are greater than 800 pps. The protection device performs defense processing on the traffic that subsequently passes through the protection device and whose destination address is the network segment 192.168.0.0/24.

In another possible implementation, after defense processing is performed on traffic, in a subsequent attack defense process of traffic, statistics of the defended traffic need to be excluded. In this way, statistics collection performed on the defended traffic for a plurality of times can be avoided, and accuracy of attack detection can be improved.

For example, after the protection device determines to perform the defense processing on the traffic that subsequently passes through the protection device and whose destination address is the host 192.168.0.2, the protection device adjusts the traffic statistics of the traffic of the network segment 192.168.0.0/24. The protection device excludes the traffic statistics 600 pps of the defended traffic of the host 192.168.0.2 from the traffic statistics 1200 pps of the traffic of the network segment 192.168.0.0/24, to obtain adjusted traffic statistics 600 pps of the traffic of the network segment 192.168.0.0/24. When the protection device performs attack detection on the traffic whose destination address is the network segment 192.168.0.0/24, the defended traffic whose destination is the host 192.168.0.2 does not need to be considered. In this way, the attack detection on traffic whose destination address is a network segment is more accurate. Similar to the network segment, for a protection group, the protection device excludes the traffic statistics 600 pps of the defended traffic of the host 192.168.0.2 from the traffic statistics 1800 pps of the traffic of the protection group A, to obtain adjusted traffic statistics 1200 pps of the traffic of the protection group A. Similarly, the protection device excludes the traffic statistics 600 pps of the defended traffic of the host 192.168.0.2 from the traffic statistics 4800 pps of the traffic of the entire domain, to obtain adjusted traffic statistics 4200 pps of the traffic of the protection group A.

Based on the foregoing method for excluding the statistics of the defended traffic, an embodiment of this disclosure provides another attack defense method, including C1 to C10.

C1: The protection device obtains the traffic statistics 600 pps of the traffic whose destination address is the host 192.168.0.2, and compares 600 pps with the threshold 500 pps of the traffic statistics corresponding to the host.

C2: The traffic statistics 600 pps of the traffic of the host 192.168.0.2 are greater than 500 pps. The protection device performs defense processing on the traffic that subsequently passes through the protection device and whose destination address is the host 192.168.0.2.

C3: The protection device obtains the traffic statistics 300 pps of the traffic whose destination address is the host 192.168.0.1, and compares 300 pps with the threshold 500 pps of the traffic statistics corresponding to the host.

C4: The traffic statistics 300 pps of the traffic of the host 192.168.0.1 are less than 500 pps.

C5: The protection device obtains the traffic statistics 600 pps of the traffic whose destination address is the network segment 192.168.0.0/24, and compares 600 pps with the threshold 800 pps of the traffic statistics corresponding to the network segment.

C6: 600 pps is less than 800 pps.

C7: The protection device obtains the traffic statistics 1200 pps of the traffic whose destination address is the protection group A, and compares 1200 pps with the threshold 2000 pps of the traffic statistics corresponding to the protection group.

C8: The traffic statistics 1200 pps of the traffic of the protection group A are less than 2000 pps.

C9: The protection device obtains the traffic statistics 4200 pps of the traffic whose destination address is the entire domain, and compares 4200 pps with the threshold 10000 pps of the traffic statistics corresponding to the entire domain.

C10: The traffic statistics 4200 pps of the traffic of the entire domain are less than 10000 pps. The protection device passes the traffic.

Based on an attack defense process in C1 to C10, after the traffic statistics 600 pps of the defended traffic of the host 192.168.0.2 are excluded, the traffic statistics of the network segment 192.168.0.0/24 do not exceed the threshold. Traffic statistics obtained by excluding the traffic statistics of the defended traffic are more accurate. This reduces or excludes an interference of the defended traffic to subsequent attack detection.

Figure 6:
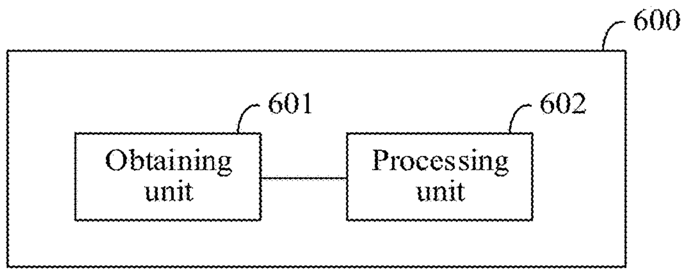
FIG. 6 is a schematic diagram of a structure of an attack defense device according to an embodiment of this disclosure.

FIG. 6 is a possible schematic diagram of a structure of an attack defense device in the foregoing embodiments. A device 600 may implement the attack defense method shown in FIG. 2 or the attack defense method shown in FIG. 3.

Refer to FIG. 6. The device 600 includes an obtaining unit 601 and a processing unit 602. The obtaining unit 601 is configured to perform S201 in FIG. 2. The processing unit 602 is configured to perform S202 in FIG. 2 and/or another attack defense process described in this specification. For example, the obtaining unit 601 is configured to perform an obtaining operation in the foregoing method examples. The processing unit 602 is configured to perform a processing operation in the foregoing method examples.

For example, the obtaining unit 601 is configured to collect statistics on first traffic that passes through a protection device, to obtain statistics of the first traffic. The processing unit 602 is configured to, in response to a case in which the statistics of the first traffic exceed a first threshold, perform, via the protection device, defense processing on the first traffic that subsequently passes through the protection device. For a specific execution process, refer to the detailed descriptions of the corresponding steps in the embodiment shown in FIG. 2, FIG. 3, FIG. 4, or FIG. 5. Details are not described herein again.

It should be noted that, in embodiments of this disclosure, division into the units is an example, and is merely a logical function division. In actual implementation, another division manner may be used. Functional units in embodiments of this disclosure may be integrated into one processing unit, or each of the units may exist alone physically, or two or more units are integrated into one unit. For example, in the foregoing embodiment, the obtaining unit and the processing unit may be a same unit, or may be different units. The integrated unit may be implemented in a form of hardware, or may be implemented in a form of a software functional unit.

Figure 7:
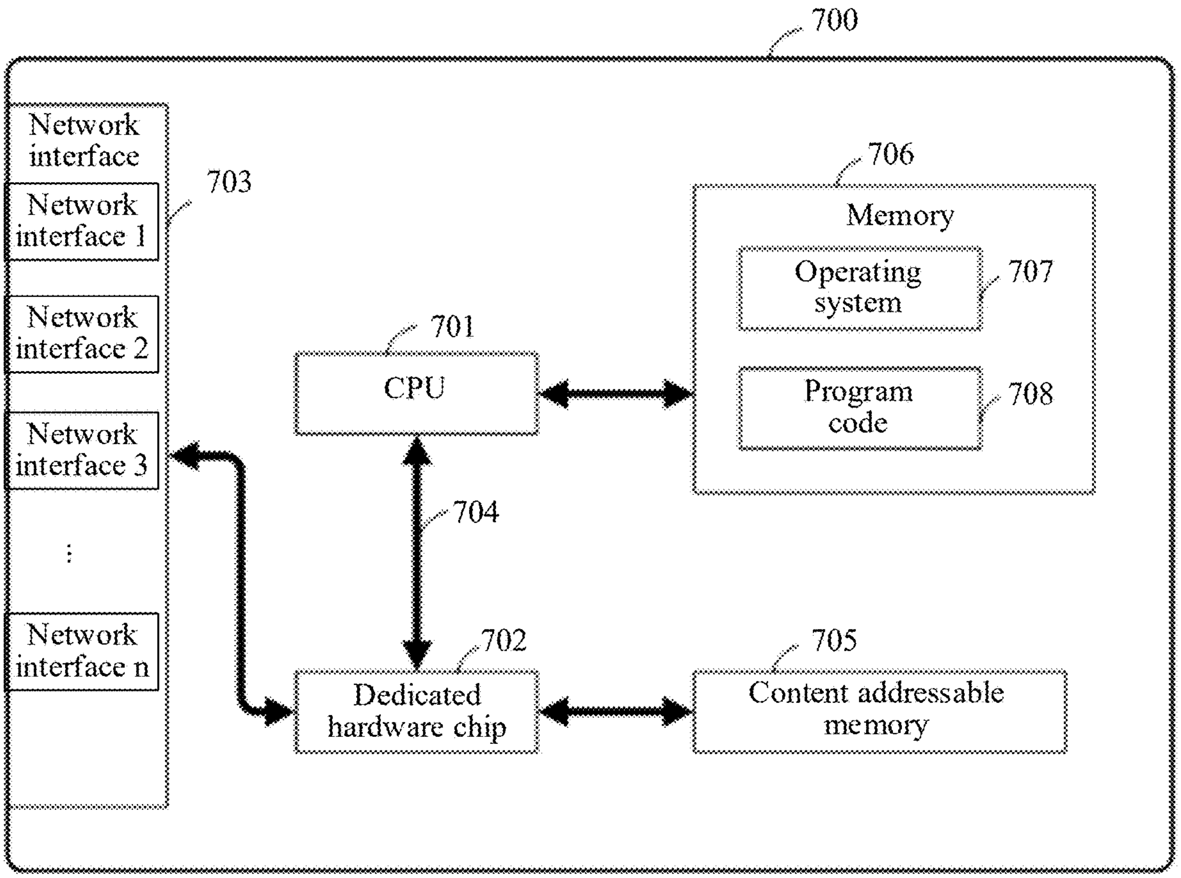
FIG. 7 is a schematic diagram of a structure of a device according to an embodiment of this disclosure.

FIG. 7 is a schematic diagram of a structure of an attack defense device 700 according to an embodiment of this disclosure. The device 600 in FIG. 6 may be implemented by the device shown in FIG. 7. Refer to FIG. 7. The device 700 includes a CPU 701, a dedicated hardware chip 702, and at least one network interface 703. The CPU 701 and the dedicated hardware chip 702 may be collectively referred to as a processor. The device 700 in FIG. 7 may be the protection device in the foregoing method embodiments.

The CPU 701 is a general-purpose central processing unit, and has high scalability and flexibility. The CPU 701 is, for example, a single-core processor (single-CPU), or a multi-core processor (multi-CPU).

The dedicated hardware chip 702 is a high-performance processing hardware module.

The dedicated hardware chip 702 includes at least one of an application-specific integrated circuit (ASIC), a field-programmable gate array (FPGA), or a network processor (NP).

The at least one network interface 703 includes, for example, a network interface 1, a network interface 2, a network interface 3, . . . , a network interface n in FIG. 7. The network interface 703 is configured to communicate with another device or a communication network by using any transceiver-type apparatus. For example, the network interface 1 in FIG. 7 communicates with a protected device, and the network interface 2 in FIG. 7 communicates with a normal client. Optically, the network interface 703 includes at least one of a wired network interface or a wireless network interface. The wired network interface is, for example, an Ethernet interface. The Ethernet interface is, for example, an optical interface, an electrical interface, or a combination thereof. The wireless network interface is, for example, a wireless protected network (wireless LAN (WLAN)) interface, a cellular network interface, or a combination thereof.

The at least one network interface 703 is connected to the dedicated hardware chip 702, and the dedicated hardware chip 702 is connected to the CPU 701 through an internal connection 704. The internal connection 704 includes one path for performing data transmission between the network interface 703, the dedicated hardware chip 702, and the CPU 701. Optionally, the internal connection 704 is a board or a bus. For example, the internal connection 704 is an Ethernet, a fiber channel, a Peripheral Component Interconnect Express (PCIe), a high-speed serial computer bus, RAPIDIO (an interconnection architecture based on data packet switching and with high performance and a low quantity of pins), INFINIBAND, or an XAUI bus (an interface extender with a feature that an Ethernet media access control (MAC) layer is connected to a physical layer).

Optionally, the protection device 700 further includes a content-addressable memory (CAM) 705. The CAM 705 is, for example, a ternary CAM (TCAM). The CAM 705 is configured to store an IP address of a protected device that has an attack risk and/or an IP address of a protected device that has no attack risk. Optionally, the CAM 705 exists independently, and is connected to the dedicated hardware chip 702 through the internal connection 704. Alternatively, the CAM 705 is integrated with the dedicated hardware chip 702, in other words, the CAM 705 is used as a memory inside the dedicated hardware chip 702.

Optionally, the device 700 further includes a memory 706. For example, the memory 706 is a read-only memory (ROM) or another type of static storage device that may store static information and instructions, or a random-access memory (RAM) or another type of dynamic storage device that may store information and instructions, or an electrically erasable programmable ROM (EEPROM), a compact disc (CD) ROM (CD-ROM) or other optical disc storage, optical disc storage (including a CD, a laser disc, an optical disc, a DIGITAL VERSATILE DISC (DVD), a BLU-RAY disc, and the like), a magnetic disk storage medium or another magnetic storage device, or any other medium that can be configured to carry or store expected program code 708 in an instruction form or a data structure form and that can be accessed by a computer. However, the memory is not limited thereto. Optionally, the memory 706 is further configured to store defense policies corresponding to a plurality of packet types. Defense policies corresponding to various packet types can be accessed by the CPU 701. For example, the memory 706 exists independently, and is connected to the CPU 701 through the internal connection 704. Alternatively, the memory 706 and the CPU 701 are integrated together.

The memory 706 stores an operating system 707 and the program code 708. Optionally, the CPU 701 reads the operating system 707 from the memory 706 and runs the operating system 707. The CPU 701 further reads the program code 708 from the memory 706, and runs the program code 708 on the operating system 707 to implement the method provided in embodiments of this disclosure. For example, the device 700 is the protection device in the foregoing method embodiments. In a process of running the program code 708, the CPU 701 performs the following process: collecting statistics on first traffic that passes through the protection device to obtain statistics of the first traffic, and in response to a case in which the statistics of the first traffic exceed a first threshold, performing defense processing on the first traffic that subsequently passes through the protection device.

Figure 8:
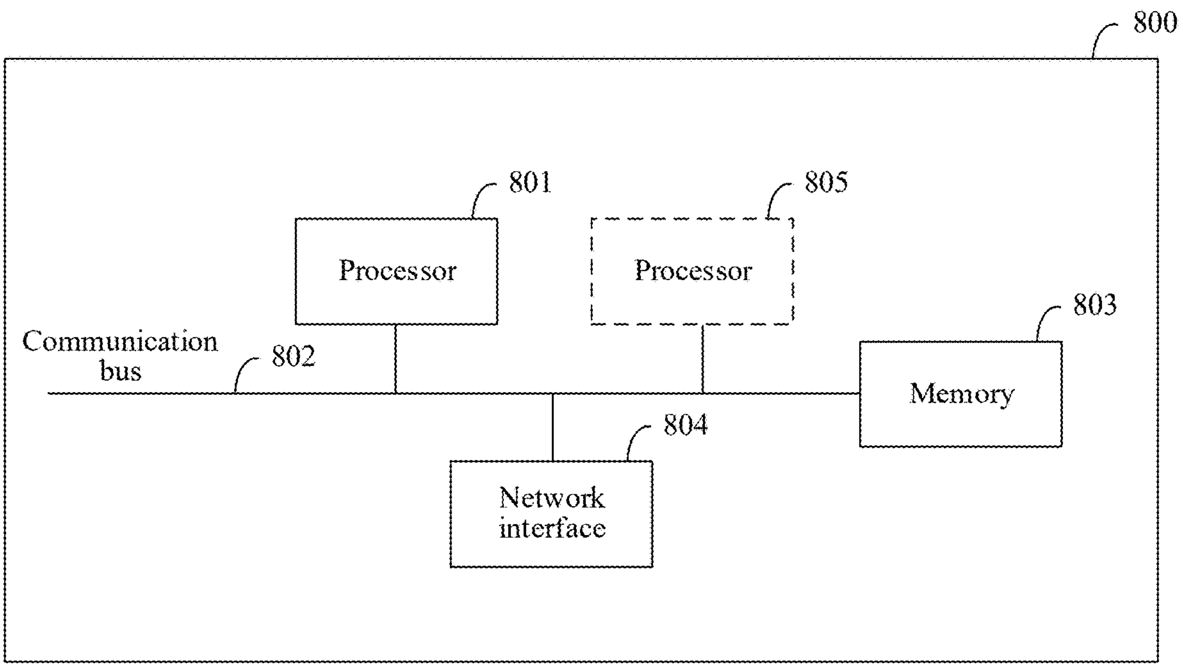
FIG. 8 is a schematic diagram of a structure of a device according to an embodiment of this disclosure.

FIG. 8 is a schematic diagram of a structure of an attack defense device 800 according to an embodiment of this disclosure. The device 600 in FIG. 6 may be implemented by the device shown in FIG. 8. The device 800 in FIG. 8 may be the server connected to the protection device in the foregoing method embodiments. Refer to FIG. 8. The device 800 includes at least one processor 801, a communication bus 802, and at least one network interface 804. Optionally, the device 1800 may further include a memory 803.

The processor 801 may be a general-purpose CPU, an ASIC, or one or more integrated circuits (ICs) for controlling program execution of the solutions of this disclosure.

For example, when the device shown in FIG. 8 is used to implement the attack defense method shown in FIG. 2, the processor may be configured to collect statistics on first traffic that passes through the protection device to obtain statistics of the first traffic, and in response to a case in which the statistics of the first traffic exceed a first threshold, perform, via the protection device, defense processing on the first traffic that subsequently passes through the protection device. For specific function implementation, refer to a processing part of the attack defense method in the method embodiments.

The communication bus 802 is configured to perform information transmission between the processor 801, the network interface 804, and the memory 803.

The memory 803 may be a ROM or another type of static storage device that may store static information and instructions. The memory 803 may alternatively be a RAM or another type of dynamic storage device that may store information and instructions, or may be a CD-ROM or other optical disc storage, optical disc storage (including a CD, a laser disc, an optical disc, a DVD, a BLU-RAY disc, and the like), a disk storage medium or another magnetic storage device, or any other medium that can be configured to carry or store expected program code in an instruction form or a data structure form and that can be accessed by a computer. However, the memory is not limited thereto. The memory 803 may exist independently, and is connected to the processor 801 through the communication bus 802. Alternatively, the memory 803 and the processor 801 may be integrated together.

Optionally, the memory 803 is configured to store program code or instructions for executing the solutions of this disclosure, and the processor 801 controls the execution. The processor 801 is configured to execute the program code or the instructions stored in the memory 803. The program code may include one or more software modules. Optionally, the processor 801 may also store the program code or the instructions for executing the solutions of this disclosure. In this case, the processor 801 does not need to read the program code or the instructions from the memory 803.

The network interface 804 is configured to communicate with another device or a communication network by using any transceiver-type apparatus. The communication network may be an Ethernet, a radio access network (RAN), a WLAN, or the like. The network interface 804 may be an Ethernet interface, a fast Ethernet (FE) interface, a gigabit Ethernet (GE) interface, or the like.

In specific implementation, in an embodiment, the device 800 may include a plurality of processors, for example, the processor 801 and a processor 805 shown in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

In the specification, claims, and accompanying drawings of this disclosure, the terms “first”, “second”, “third”, “fourth”, and the like are intended to distinguish between similar objects but do not necessarily indicate a specific sequence or order. It should be understood that the data termed in such a way are interchangeable in proper circumstances so that embodiments described herein can be implemented in other orders than the order illustrated or described herein. In addition, the terms “include”, “have”, and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

In this disclosure, "at least one item (piece)" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In this disclosure, it is considered that "A and/or B" includes only A, only B, and A and B.

It may be clearly understood by persons skilled in the field that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiments are merely examples. For example, division into the units is merely logical module division and may be other division during actual implementation. For example, a plurality of units or components may be combined or integrated into another system, or some features may be ignored or not performed. In addition, displayed or discussed mutual couplings or direct couplings or communication connections may be implemented through some interfaces. Indirect couplings or communication connections between the apparatuses or the units may be implemented in electrical, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this disclosure may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this disclosure essentially, or the part contributing to a conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this disclosure. The storage medium includes any medium that can store program code, such as a Universal Serial Bus (USB) flash drive, a removable hard disk, a ROM, a RAM, a magnetic disk, or an optical disc.

Persons skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A method comprising:

collecting first statistics on first traffic across a first address range in a protected network, wherein the first traffic passes through a protection device, wherein the protection device is deployed between an Internet and the protected network, wherein the first traffic is of a target type and is from the Internet, wherein addresses in the protected network are divided into a plurality of address ranges that comprise the first address range, and wherein the first address range is a proper subset of a second address range in the plurality of address ranges or the second address range is a proper subset of the first address range;

performing, in response to the first statistics exceeding a first threshold and via the protection device, first defense processing on the first traffic to obtain first defended traffic, wherein the first defense processing comprises at least one of packet discarding, source Internet Protocol (IP) address detection, traffic redirection, or verification code technologies;

collecting, in response to the first statistics not exceeding the first threshold, second statistics on second traffic across the second address range, wherein the second traffic is of the target type, passes through the protection device, and is from the Internet; and performing, in response to the second statistics exceeding a second threshold and via the protection device, second defense processing on the second traffic to obtain second defended traffic, wherein the second defense processing comprises at least one of packet discarding, source Internet Protocol (IP) address detection, traffic redirection, or verification code technologies.

2. The method of claim 1, wherein the second address range is the proper subset of the first address range, wherein a protection group comprises a plurality of network segments in the protected network, wherein a network segment is a continuous address space with a same subnet mask in the protected network, wherein a host group comprises a plurality of Internet Protocol (IP) addresses in one network segment in the protected network, wherein a host is an IP address in the protected network, wherein when the first address range is all address ranges in the protected network, the second address range comprises the protection group, the network segment, the host group, or the host, wherein when the first address range is the protection group, the second address range comprises the network segment, the host group, or the host, wherein when the first address range is the network segment, the second address range comprises the host group or the host, and wherein when the first address range is the host group, the second address range comprises the host.

3. The method of claim 1, wherein the first address range is the proper subset of the second address range, wherein a protection group comprises a plurality of network segments in the protected network, wherein a network segment is a continuous address space with a same subnet mask in the protected network, wherein a host group comprises a plurality of Internet Protocol (IP) addresses in one network segment in the protected network, wherein a host is an IP address in the protected network, wherein when the first address range is the host, the second address range comprises the host group, the network segment, the protection group, or all address ranges in the protected network, wherein when the first address range is the host group, the second address range comprises the network segment, the protection group, or all the address ranges in the protected network, wherein when the first address range is the network segment, the second address range comprises the protection group or all the address ranges in the protected network, and wherein when the first address range is the protection group, the second address range comprises all the address ranges in the protected network.

4. The method of claim 3, wherein the second statistics do not comprise first defended traffic statistics of the first defended traffic, wherein the first defended traffic is of the target type and has a third destination address that is in a third address range, wherein the third address range and the first address range are of the second address range, and wherein the third address range does not overlap the first address range.

5. The method of claim 4, wherein the first statistics do not comprise second defended traffic statistics of the second defended traffic, wherein the second defended traffic is of the target type and has a fourth destination address that is in a fourth address range, and wherein the fourth address range is of the first address range.

6. The method of claim 1, wherein the target type comprises a Transmission Control Protocol (TCP) packet, a User Datagram Protocol (UDP) packet, a synchronize sequence numbers (SYN) packet, a SYN acknowledgement (SYN-ACK) packet, an acknowledgement (ACK) packet, a terminate a connection (FIN) packet, a reset the connection (RST) packet, a Domain Name System (DNS) packet, a Hypertext Transfer Protocol (HTTP) packet, an Internet Control Message Protocol (ICMP) packet, an HTTP Secure (HTTPS) packet, a Session Initiation Protocol (SIP) packet, a new session, or a concurrent session.

7. An apparatus comprising:

a memory configured to store instructions; and one or more processors coupled to the memory and configured to execute the instructions to cause the apparatus to:

collect first statistics on first traffic across a first address range in a protected network, wherein the first trafficthat passes through a protection device, wherein the protection device is deployed between an Internet and aand the protected network, wherein the first traffic is of a target type and is from the Internet, wherein addresses in the protected network are divided into a plurality of address ranges that comprise the first address range, and wherein the first address range is a proper subset of a second address range in the plurality of address ranges or the second address range is a proper subset of the first address range;

perform, in response to the first statistics exceeding a first threshold and via the protection device, first defense processing on the first traffic to obtain first defended traffic, wherein the first defense processing comprises at least one of packet discarding, source Internet Protocol (IP) address detection, traffic redirection, or verification code technologies;

collect, in response to the first statistics not exceeding the first threshold, second statistics on second traffic across the second address range, wherein the second traffic is of the target type, passes through the protection device, and is from the Internet; and perform, in response to the second statistics exceeding a second threshold and via the protection device, second defense processing on the second traffic subsequently flowing through the protective device to obtain second defended traffic, wherein the second defense processing comprises at least one of packet discarding, source Internet Protocol (IP) address detection, traffic redirection, or verification code technologies.

8. The apparatus of claim 7, wherein the second address range is the proper subset of the first address range, wherein a protection group comprises a plurality of network segments in the protected network, wherein a network segment is a continuous address space with a same subnet mask in the protected network, wherein a host group comprises a plurality of Internet Protocol (IP) addresses in one network segment in the protected network, wherein a host is an IP address in the protected network, wherein when the first address range is all address ranges in the protected network, the second address range comprises the protection group, the network segment, the host group, or the host, wherein when the first address range is the protection group, the second address range comprises the network segment, the host group, or the host, wherein when the first address range is the network segment, the second address range comprises the host group or the host, and wherein when the first address range is the host group, the second address range comprises the host.

9. The apparatus of claim 7, wherein the first address range is the proper subset of the second address range, wherein a protection group comprises a plurality of network segments in the protected network, wherein a network segment is a continuous address space with a same subnet mask in the protected network, wherein a host group comprises a plurality of Internet Protocol (IP) addresses in one network segment in the protected network, wherein a host is an IP address in the protected network, wherein when the first address range is the host, the second address range comprises the host group, the network segment, the protection group, or all address ranges in the protected network, wherein when the first address range is the host group, the second address range comprises the network segment, the protection group, or all the address ranges in the protected network, wherein when the first address range is the network segment, the second address range comprises the protection group or all the address ranges in the protected network, and wherein when the first address range is the protection group, the second address range comprises all the address ranges in the protected network.

10. The apparatus of claim 9, wherein the second statistics do not comprise first defended traffic statistics of the first defended traffic, wherein the first defended traffic is of the target type and has a third destination address that is in a third address range, wherein the third address range and the first address range are of the second address range, and wherein the third address range does not overlap the first address range.

11. The apparatus of claim 10, wherein the first statistics do not comprise second defended traffic statistics of the second defended traffic, wherein the second defended traffic is of the target type and has a fourth destination address that is in a fourth address range, and wherein the fourth address range is of the first address range.

12. The apparatus of claim 7, wherein the target type comprises a Transmission Control Protocol (TCP) packet, a User Datagram Protocol (UDP) packet, a synchronize sequence numbers (SYN) packet, a SYN acknowledgement (SYN-ACK) packet, an acknowledgement (ACK) packet, a terminate a connection (FIN) packet, a reset the connection (RST) packet, a Domain Name System (DNS) packet, a Hypertext Transfer Protocol (HTTP) packet, an Internet Control Message Protocol (ICMP) packet, an HTTP Secure (HTTPS) packet, a Session Initiation Protocol (SIP) packet, a new session, or a concurrent session.

13. A computer program product comprising computer-executable instructions that are stored on a non-transitory computer-readable medium and that, when executed by one or more processors, cause an apparatus to:

collect first statistics on first traffic across a first address range in a protected network, wherein the first traffic passes through a protection device, wherein the protection device is deployed between an Internet and the protected network, wherein the first traffic is of a target type and is from the Internet, wherein addresses in the protected network are divided into a plurality of address ranges that comprise the first address range, and wherein the first address range is a proper subset of a second address range in the plurality of address ranges or the second address range is a proper subset of the first address range;

perform, in response to the first statistics exceeding a first threshold and via the protection device, first defense processing on the first traffic to obtain first defended traffic, wherein the first defense processing comprises at least one of packet discarding, source Internet Protocol (IP) address detection, traffic redirection, or verification code technologies;

collect, in response to the first statistics not exceeding the first threshold, second statistics on second traffic across the second address range, wherein the second traffic is of the target type, passes through the protection device, and is from the Internet; and perform, in response to the second statistics exceeding a second threshold and via the protection device, second defense processing on the second traffic subsequently flowing through the protective device to obtain second defended traffic, wherein the second defense processing comprises at least one of packet discarding, source Internet Protocol (IP) address detection, traffic redirection, or verification code technologies.

14. The computer program product of claim 13, wherein the second address range is the proper subset of the first address range, wherein a protection group comprises a plurality of network segments in the protected network, wherein a network segment is a continuous address space with a same subnet mask in the protected network, wherein a host group comprises a plurality of Internet Protocol (IP) addresses in one network segment in the protected network, wherein a host is an IP address in the protected network, wherein when the first address range is all address ranges in the protected network, the second address range comprises the protection group, the network segment, the host group, or the host, wherein when the first address range is the protection group, the second address range comprises the network segment, the host group, or the host, wherein when the first address range is the network segment, the second address range comprises the host group or the host, and wherein when the first address range is the host group, the second address range comprises the host.

15. The computer program product of claim 13, wherein the first address range is the proper subset of the second address range, wherein a protection group comprises a plurality of network segments in the protected network, wherein a network segment is a continuous address space with a same subnet mask in the protected network, wherein a host group comprises a plurality of Internet Protocol (IP) addresses in one network segment in the protected network, wherein a host is an IP address in the protected network, wherein when the first address range is the host, the second address range comprises the host group, the network segment, the protection group, or all address ranges in the protected network, wherein when the first address range is the host group, the second address range comprises the network segment, the protection group, or all the address ranges in the protected network, wherein when the first address range is the network segment, the second address range comprises the protection group or all the address ranges in the protected network, and wherein when the first address range is the protection group, the second address range comprises all the address ranges in the protected network.

16. The computer program product of claim 15, wherein the second statistics do not comprise first defended traffic statistics of the first defended traffic, wherein the first defended traffic is of the target type and has a third destination address that is in a third address range, wherein the third address range and the first address range are of the second address range, and wherein the third address range does not overlap the first address range.

17. The computer program product of claim 16, wherein the first statistics do not comprise second defended traffic statistics of the second defended traffic, wherein the second defended traffic is of the target type and has a fourth destination address that is in a fourth address range, wherein the fourth address range is of the first address range, and wherein the target type comprises a Transmission Control Protocol (TCP) packet, a User Datagram Protocol (UDP) packet, a synchronize sequence numbers (SYN) packet, a SYN acknowledgement (SYN-ACK) packet, an acknowledgement (ACK) packet, a terminate a connection (FIN) packet, a reset the connection (RST) packet, a Domain Name System (DNS) packet, a Hypertext Transfer Protocol (HTTP) packet, an Internet Control Message Protocol (ICMP) packet, an HTTP Secure (HTTPS) packet, a Session Initiation Protocol (SIP) packet, a new session, or a concurrent session.

18. The method of claim 1, wherein the first address range is a proper subset of the second address range.

19. The method of claim 1, wherein the second address range is a proper subset of the first address range.

20. The method of claim 1, wherein addresses of the protected network are divided into at least two of five granularities, wherein the five granularities comprise an entire domain, a protection group, a network segment, a host group, and a host, wherein the first address range is any one of the protection group, the network segment, or the host group, and wherein the second address range has a second granularity that is less than a first granularity of the first address range.

* * * * *